US009092653B2

(12) United States Patent
Setlak et al.

(10) Patent No.: US 9,092,653 B2
(45) Date of Patent: *Jul. 28, 2015

(54) FINGER BIOMETRIC SENSOR INCLUDING LATERALLY ADJACENT PIEZOELECTRIC TRANSDUCER LAYER AND ASSOCIATED METHODS

(71) Applicant: APPLE INC., Cupertino, CA (US)

(72) Inventors: Dale R. Setlak, Melbourne, FL (US); James Warren Neil, Melbourne, FL (US); Daryl D. Williams, Melbourne Beach, FL (US); Richard J. Jones, Alburtis, PA (US); Nicolaas W. Van Vonno, Melbourne, FL (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,410

(22) Filed: Dec. 17, 2013

(65) Prior Publication Data

US 2014/0105469 A1    Apr. 17, 2014

Related U.S. Application Data

(63) Continuation of application No. 12/537,711, filed on Aug. 7, 2009, now Pat. No. 8,618,910.

(51) Int. Cl.
*G06K 9/00* (2006.01)
*H01L 41/00* (2013.01)
*G05B 19/00* (2006.01)

(52) U.S. Cl.
CPC .......... *G06K 9/00013* (2013.01); *G06K 9/0002* (2013.01); *Y10T 29/42* (2013.01)

(58) Field of Classification Search
CPC .......... G06K 9/00013; G06K 9/00026; G06K 9/0012; G06K 9/0004; G06K 9/00885; G06K 9/00053; G06K 9/00006; G06K 9/00067; G06K 9/00087; G06K 9/00268; G06K 9/00; G06K 9/0002; G06F 21/31; G06F 21/32; G06F 21/34; G06F 21/35; G06F 21/45; G06F 3/042; G06F 2203/033; H04L 63/0861; H04L 63/083; H04L 63/10; H04L 63/0428
See application file for complete search history.

(56) References Cited

U.S. PATENT DOCUMENTS

| | | | |
|---|---|---|---|
| 4,120,585 | A | 10/1978 | DePalma et al. |
| 5,940,526 | A | 8/1999 | Setlak et al. |
| 5,953,441 | A | 9/1999 | Setlak |
| 6,144,332 | A | 11/2000 | Reindl et al. |
| 6,289,114 | B1 | 9/2001 | Mainguet |
| 6,522,773 | B1 | 2/2003 | Houdeau |
| 6,720,712 | B2 | 4/2004 | Scott et al. |

(Continued)

*Primary Examiner* — Kerri McNally
*Assistant Examiner* — Renee Dorsey
(74) *Attorney, Agent, or Firm* — Allen, Dyer, Doppelt, Milbrath & Gilchrist, P.A.

(57) ABSTRACT

A finger biometric sensor may include a finger biometric sensing layer having an upper major surface and at least one sidewall surface adjacent thereto. The finger biometric layer may be for generating signals related to at least one biometric characteristic of the user's finger when positioned adjacent the first major surface. The finger biometric sensor may also include a piezoelectric transducer layer coupled to the at least one sidewall surface of the finger biometric sensing layer and a plurality of electrically conductive layers coupled to the piezoelectric transducer layer to define transducer electrodes. At least one of the electrically conductive layers may also cooperate with the finger biometric sensing layer for sensing the at least one biometric characteristic.

28 Claims, 11 Drawing Sheets

(56) References Cited

U.S. PATENT DOCUMENTS

| | | |
|---|---|---|
| 6,898,299 B1 | 5/2005 | Brooks |
| 6,912,299 B1 | 6/2005 | Hoshino |
| 7,132,780 B2 | 11/2006 | Scott |
| 7,266,226 B2 | 9/2007 | Hwang |
| 7,358,515 B2 | 4/2008 | Setlak et al. |
| 7,361,919 B2 | 4/2008 | Setlak |
| 2001/0017934 A1 | 8/2001 | Paloniemi et al. |
| 2004/0155752 A1 | 8/2004 | Radke |
| 2004/0264746 A1 | 12/2004 | Polcha et al. |
| 2005/0073221 A1 | 4/2005 | Albsmeier et al. |
| 2005/0083310 A1 | 4/2005 | Safai et al. |
| 2005/0111707 A1 | 5/2005 | Bohn et al. |
| 2006/0000285 A1 | 1/2006 | Edmonson et al. |
| 2006/0239517 A1 | 10/2006 | Creasey et al. |
| 2007/0076923 A1 | 4/2007 | Chiu |
| 2008/0063245 A1 | 3/2008 | Benkley et al. |

FINGER BIOMETRIC SENSOR INCLUDING LATERALLY ADJACENT PIEZOELECTRIC TRANSDUCER LAYER AND ASSOCIATED METHODS

FIELD OF THE INVENTION

The present invention relates to the field of electronics, and, more particularly, to the field of finger biometric sensors, and associated manufacturing methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

It may also be desirable to have a finger biometric sensor powered down or in a low power consumption mode until a finger is placed in a position to be sensed. The finger biometric sensor may desirably detect when the finger is in a sensing position and then activate itself and any other devices, such as processors, needed to perform the functions desired by the user.

Several approaches for detecting the presence of a finger in a desired position are known. Typically, in some approaches, a small part of a finger imaging system may be activated on a periodic basis to determine if a finger is present. A negative aspect of these approaches is that they dissipate power in the finger biometric sensor, and/or its supporting circuitry, during a time when the finger imaging system is waiting for the finger to appear. Quiescent power consumption while in a finger detect (waiting) mode drains a battery in a portable electronic device.

In an attempt to reduce the quiescent power consumption, some finger presence detection approaches have been proposed where the fingerprint sensor is mounted on a mechanically actuated electrical switching element. Finger pressure on the fingerprint sensor moves the switching element, causing the switch to close and activating sensor electronics or the supporting circuitry. While this approach may consume no quiescent current, it may be difficult to reliably implement because it requires the finger biometric sensor itself to be a moving part.

Several approaches to finger biometric sensors including a switch are disclosed in U.S. Pat. No. 4,120,585 to DePalma et al.; U.S. Pat. No. 6,522,773 to Houdeau; U.S. Pat. No. 6,912,299 to Hoshino et al.; and U.S. Pat. No. 7,266,226 to Hwang. U.S. Published Application No. 2004/0155752 to Radke also discloses a switch associated with a finger biometric sensor. U.S. Patent Application No. 2007/0076923 to Chiu, for example, discloses a finger sensing device that has a power control switch at the tip of the sensor panel, and a second switch underneath the finger sensor to initiate the finger sensing operation.

Other finger biometric sensors may include power controls integrated within the finger print imaging system, or adjacent the fingerprint sensor, such as disclosed in U.S. Published Application No. 2006/0239517 to Creasy et al. Still, other finger biometric sensors, such as disclosed in U.S. Pat. No. 5,940,526 to Setlak et al., include power control to only active portions of the finger sensor, thus resulting in a standby mode.

Still further, it may be desirable to provide the user with tactile feedback when a finger is placed on the biometric finger sensor. U.S. Published Application No. 2001/0017934 to Paloniemi et al. discloses a fingerprint sensor mounted on a switch. When the fingerprint sensor is tapped, the switch is operated and provides an audible and/or tactile feedback to a user, for example, by movement of a domed membrane. U.S. Published Application No. 2005/0111707 to Bohn et al. discloses a fingerprint scanner that provides a tactile and/or audible indication from an end of scan switch located on a housing frame.

U.S. Published Application No. 2006/0239517 to Creasey et al., as briefly described above, further discloses a finger sensor mounted on a housing of a device and providing feedback to a user in the form of physical feeling. A platen receives a user's finger and is coupled to a base of the housing. An activation sensor, which may be a piezoelectric sensor, is coupled to the platen and detects force on the platen in response to a user's finger pressed on the sensor.

SUMMARY OF THE INVENTION

In view of the foregoing background, it is therefore an object of the present invention to provide a finger biometric sensor with power control and/or feedback features.

This and other objects, features, and advantages in accordance with the present invention are provided by a finger biometric sensor that may include a finger biometric sensing layer having an upper major surface at least one sidewall surface and for generating signals related to at least one biometric characteristic of the user's finger when positioned adjacent the upper major surface. A piezoelectric transducer layer may be adjacent the at least one sidewall surface of the finger biometric sensing layer. A plurality of electrically conductive layers may also be coupled to the piezoelectric transducer layer to define transducer electrodes. At least one of the electrically conductive layers may also cooperate with the finger biometric sensing layer for sensing the at least one biometric characteristic. Accordingly, a finger biometric sensor is provided that may include power control and/or feedback features.

More particularly, the at least one electrically conductive layer may include a drive electrode for the finger biometric sensing layer. The finger biometric sensor may further include a drive circuit coupled to the transducer electrodes to drive the piezoelectric transducer layer to impart a force to the user's finger, for example. The finger biometric sensor may further include a sense circuit coupled to the transducer electrodes to sense from the piezoelectric transducer layer a force imparted by the user's finger. Advantageously, the finger biometric sensor may provide tactile feedback to the user's finger, it may provide finger presence detection for power control, or it may provide both.

Additionally, the finger biometric sensor may further include a reading circuit coupled to the finger biometric sensing layer for reading signals therefrom, for example. The finger biometric sensor may also include a power up circuit for selectively powering up the reading circuit based upon the sense circuit. The sense circuit may generate a pressure output signal related to an amount of pressure applied by the user's finger, for example, for other functions besides power control.

The finger biometric sensor may further include a matcher coupled to the finger biometric sensing layer for determining a match based upon the at least one biometric characteristic of the user's finger. The finger biometric sensor may also include a navigation circuit coupled to the transducer electrodes for performing at least one navigation function, for example. Additionally, the finger biometric sensor may also include a feedback circuit coupled to the transducer electrodes for performing at least one feedback function. The feedback circuit and/or the navigation circuit may be embodied in a processor, which may be included within or external to the finger biometric sensor or shared between the sensor and external circuitry.

The finger biometric sensing layer may include or be part of an integrated circuit. Additionally, the finger biometric sensor may include a flexible mounting substrate overlaying the piezoelectric transducer layer and the finger biometric sensing layer.

Another aspect is directed to a method for making a finger biometric sensor. The method may include providing a finger biometric sensing layer having an upper major surface and at least one sidewall surface adjacent thereto and for generating signals related to at least one biometric characteristic of the user's finger when positioned adjacent the first major surface. The method may further include positioning a piezoelectric transducer layer adjacent the at least one sidewall major surface of the finger biometric sensing layer. The method may still further include coupling a plurality of electrically conductive layers to the piezoelectric transducer layer to define transducer electrodes.

DETAILED DESCRIPTION OF THE PREFERRED EMBODIMENTS

Figure 1:
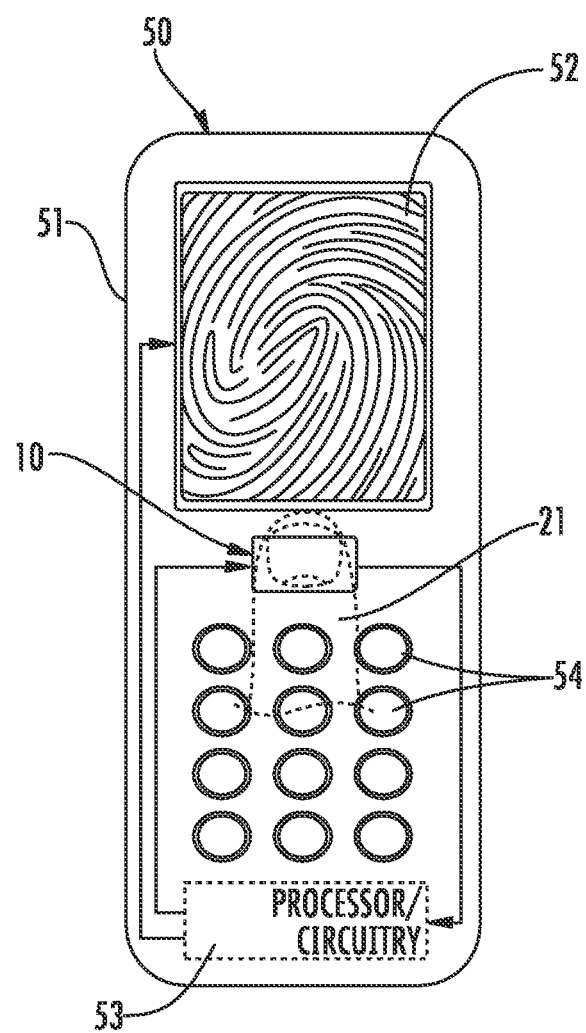
FIG. 1 is a schematic plan view of a cellular telephone including a finger biometric sensor in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in different embodiments.

Referring initially to FIGS. 1-4, an embodiment of a finger sensor 10 in accordance with the present invention are now described. The finger sensor 10 is illustratively mounted on an exposed surface of a cellular telephone 50. Of course, the finger sensor 10 can also be used other portable and stationary electronic devices as well.

The cellular phone 50 includes a housing 51, a display 52 carried by the housing, and processor/operating circuitry 53 also carried by the housing and connected to the display and to the finger sensor 10. An array of input keys 54 are also provided and used for conventional cellphone dialing and other applications as will be appreciated by those skilled in the art.

The finger sensor 10 may be of the slide type where the user's finger 21 slides over the sensing area to generate a sequence of finger images. Alternatively, the finger sensor 10 could be of the static placement type, where the user simply places his finger 21 onto the sensing surface to generate a finger image. Of course, the finger sensor 10 may also include circuitry embedded therein and/or in cooperation with the processor/circuitry 53 to provide menu navigation and selection functions, tactile feedback, and/or power up functions as will be appreciated by those skilled in the art and as described in further detail below.

Figure 2:
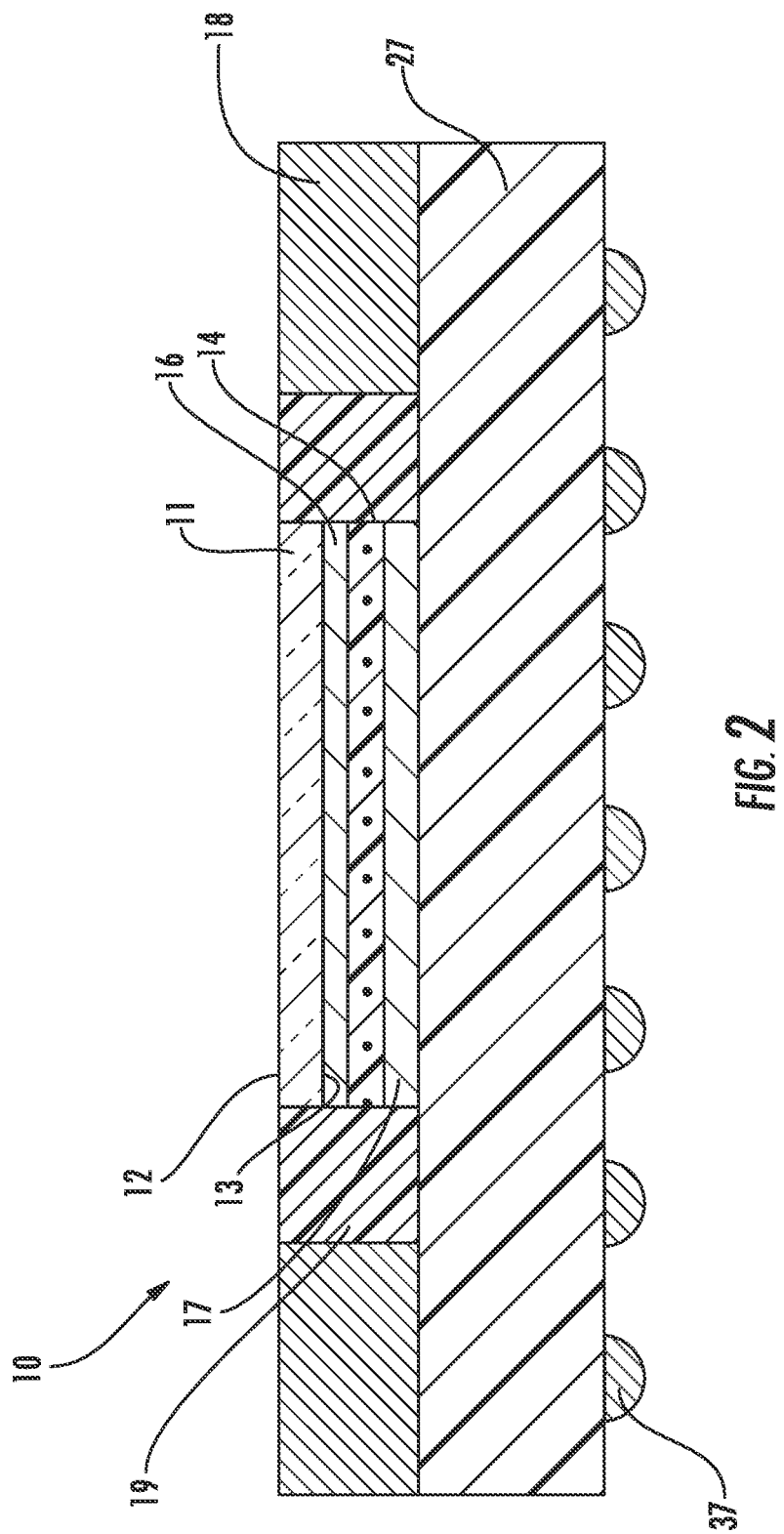
FIG. 2 is a schematic cross-sectional view of the finger biometric sensor shown in FIG. 1.

Referring more particularly to FIG. 2, the finger biometric sensor 10 includes a finger biometric sensing layer 11 having opposing first and second major surfaces 12, 13 and for generating signals related to at least one biometric characteristic of the user's finger when positioned adjacent the first major surface. The finger biometric sensor 10 may include electric field sensing pixels, for example, as described in U.S. Pat. No. 7,358,515, and assigned to the assignee of the present application, the entire contents of which are herein incorporated by reference. Other finger biometric sensing technologies may be used, as will be appreciated by those skilled in the art.

A piezoelectric transducer layer 14 is illustratively coupled to the second major surface 13 of the finger biometric sensing layer 11. The piezoelectric transducer layer 14 may be a polyvinylidene fluoride material, or more specifically Kynar®, which is available from Arkuna, Inc., of Philadelphia, Pa. A polyvinylidene fluoride material can advantageously be fabricated down to a thickness to about 25 microns, for example, thus reducing the overall size impact to the finger biometric sensor 10. Other piezoelectric materials may be used, such as piezo-ceramic materials or piezo-plastic materials, for example.

Moreover, the piezoelectric transducer layer 14 may be applied to the finger biometric sensor 10 as a pre-formed film, for example. Alternatively, the piezoelectric transducer layer 14 can be printed or spun. However, if the piezoelectric transducer layer 14 is not pre-formed, it may be polarized as part of its manufacturing process. Polarization of the piezoelectric transducer layer 14 typically involves using controlled high-voltage corona discharges across the piezoelectric transducer layer. The piezoelectric transducer layer 14 may be applied using other methods, or in other forms, as will be appreciated by those skilled in the art.

Electrically conductive layers 16, 17 are coupled to the piezoelectric transducer layer 14 to define transducer electrodes. More particularly, the upper conductive layer 16 may be considered as a voltage reference plane and is illustratively coupled between the finger sensing layer 11 and the piezoelectric transducer layer 14. Additionally, the lower conductive layer 17 may be considered as a voltage collection layer coupled to a bottom of the piezoelectric transducer layer 14. As will be appreciated by those skilled in the art, a piezoelectric voltage is generated between the upper conductive layer 16 and the lower conductive layer 17 when a force is imparted by a user's finger to the piezoelectric transducer layer 14 via the intervening electrically conductive layer 16. In other embodiments there may be no intervening layer or more than one intervening layer.

The finger biometric sensing layer 11 is advantageously packaged as an integrated circuit, for example, in a ball grid array package illustratively including the mounting substrate 27 below the electrically conductive layer 17, and the array of electrically conductive balls 37 carried by the substrate. Other packaging arrangements will be appreciated by those skilled in the art.

A finger drive electrode 18 is illustratively positioned on the mounting substrate 27 and is separated from the biometric sensing layer 11 and the piezoelectric transducer layer 14 by a molded plastic ring 19. This finger drive electrode 18 is advantageously used with electric field sensing pixels as will be appreciated by those skilled in the art, but may not be needed for other sensing technologies.

Figure 3:
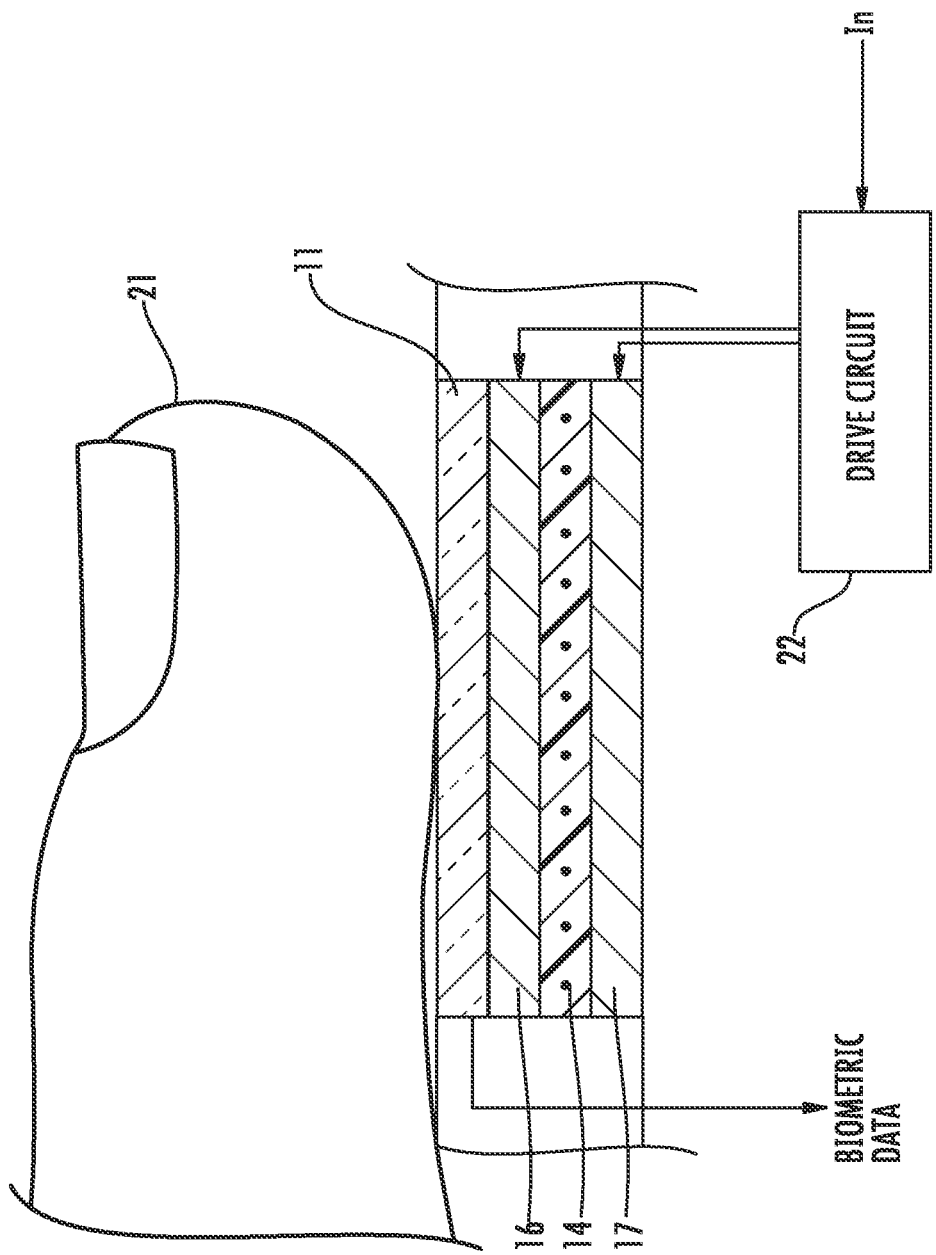
FIG. 3 is a schematic block diagram of the finger biometric sensor and related circuitry shown in FIG. 1.
Figure 4:
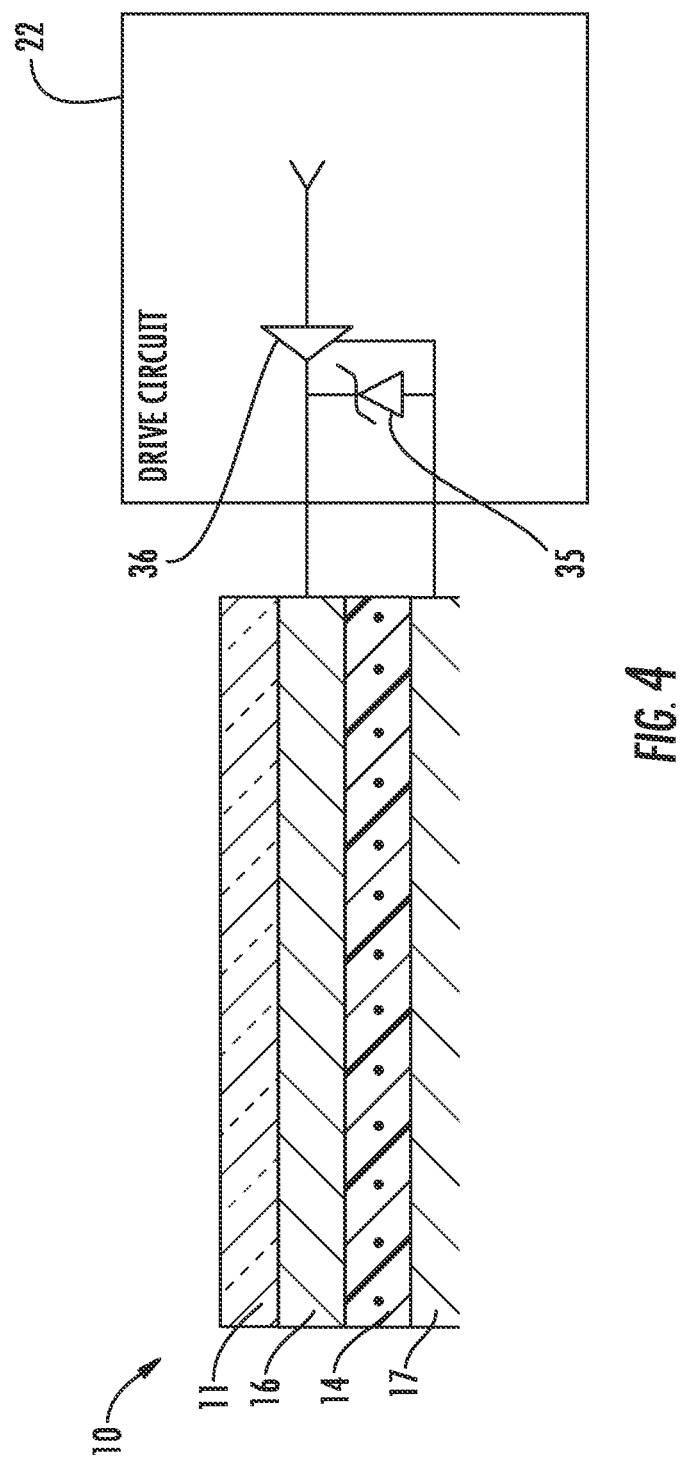
FIG. 4 is a more detailed schematic block diagram of the finger biometric sensor and related circuitry shown in FIG. 3.
Figure 5:
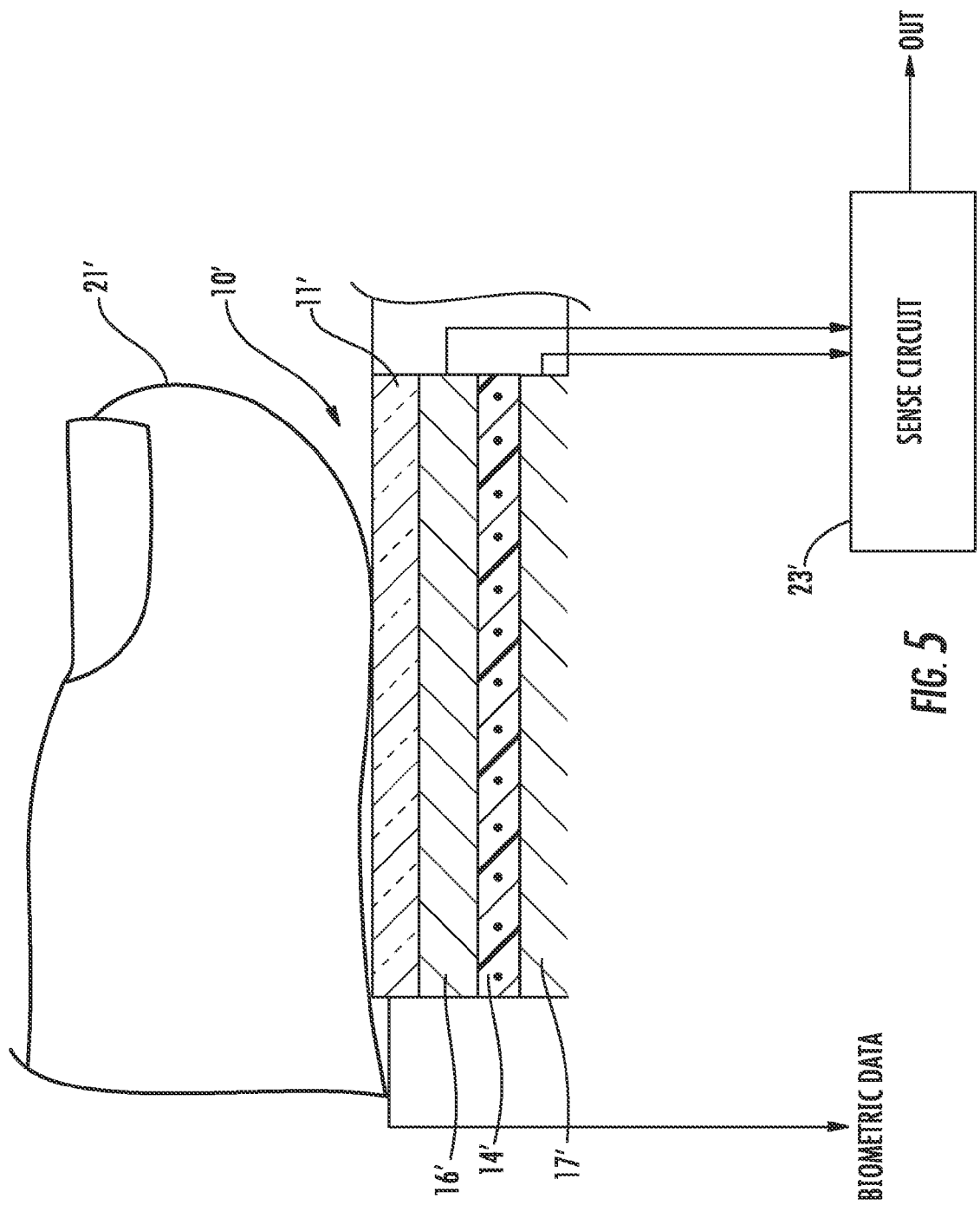
FIG. 5 is a schematic block diagram of another embodiment of a finger biometric sensor and related circuitry in accordance with the present invention.

Referring more particularly to FIGS. 3-4, the finger biometric sensor 10 includes a drive circuit 22 that is illustratively coupled to the transducer electrodes, that is, the electrically conductive layers 16, 17 to impart a force to the user's finger 21. More particularly, the drive circuit 22 advantageously generates a drive voltage waveform that is applied to the piezoelectric transducer layer 14, which, in turn, generates a mechanical force on a user's finger 21 when positioned adjacent the first major surface of the finger biometric sensing layer 11. One possible implementation of a drive circuit 22 includes a zener diode 35 coupled in parallel with the electrically conductive layers 16, 17 to operate as a shunt regulator, and a drive amplifier 36 coupled to the zener diode, as illustrated in FIG. 4. As will be appreciated by those skilled in the art, the piezoelectric transducer layer 14 will vibrate when the drive circuit 22 provides an AC voltage to the piezoelectric transducer layer. The drive circuit 22 may drive the piezoelectric transducer layer 14 at voltage levels similar to an audio amplifier driving a piezoelectric headphone, for example.

The vibration of the piezoelectric transducer layer 14 advantageously provides tactile or haptic feedback to the user. Additionally, proper envelope shaping of the waveform along with fine-tuning of the frequency of short AC signal bursts from the drive circuit 22 to the piezoelectric transducer layer 14 can give the user the tactile impression of a click. This feedback may be particularly helpful to a user performing a navigation function on an electronic device, such as the cellphone 50, for example, where a user is scrolling down a menu and the sensor generates a click each time the cursor crosses from one menu item to the next. Other types of tactile feedback different than a click, such as a longer duration vibration, may be used, and may be used for other applications than menu scrolling, as will be appreciated by those skilled in the art.

Referring now additionally to FIGS. 5-8, the finger biometric sensor 10' includes a sense circuit 23' that is coupled to the electrically conductive layers 16', 17' to sense a voltage generated by the piezoelectric transducer layer 14' based upon a force imparted by the user's finger 21'. The sense circuit 23' may be used as a standalone circuit or in conjunction with other circuitry.

When a user's finger 21' imparts a force on the piezoelectric transducer layer 14' via the intervening electrically conductive layer 16', an electrical charge displacement signal or voltage signal is generated between the electrically conductive layers 16', 17'. The voltage signal will vary depending on the amount of force received by the piezoelectric transducer layer 14'.

Figure 6:
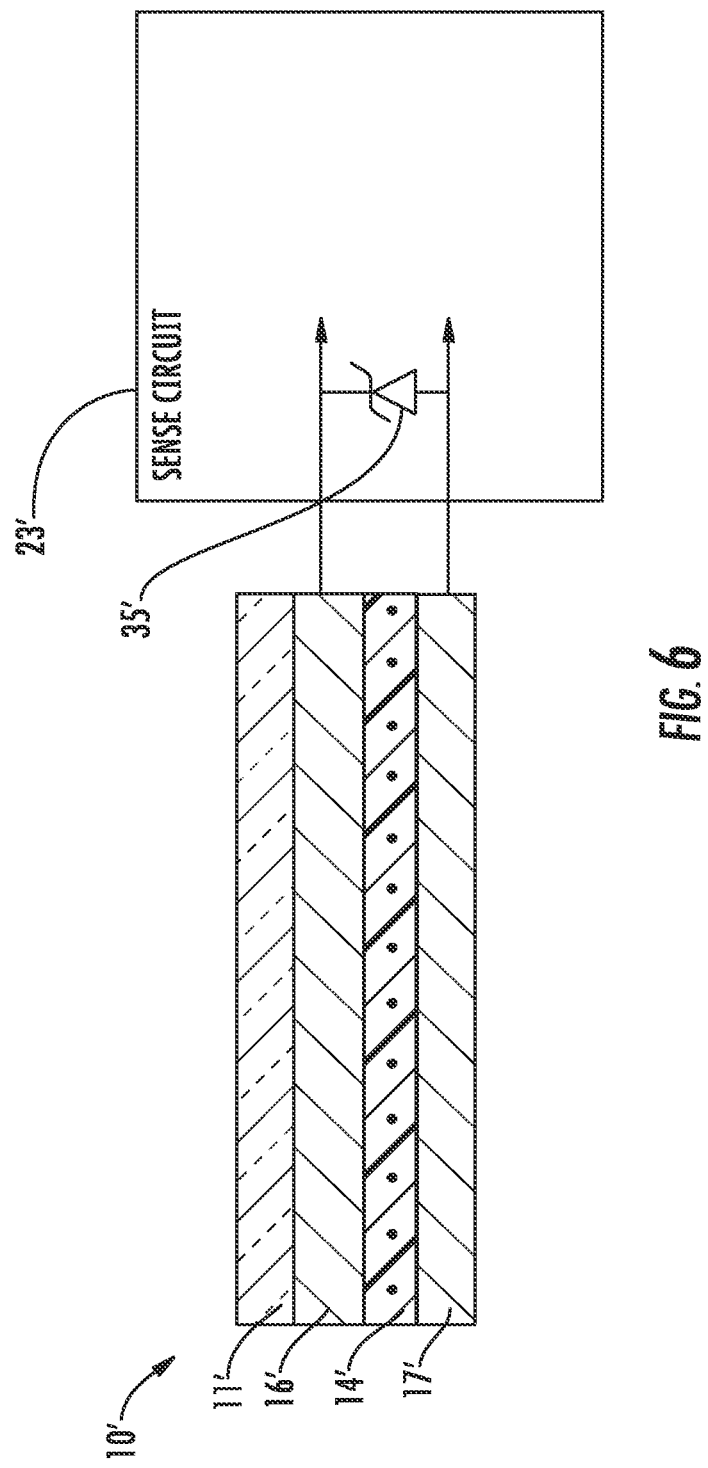
FIG. 6 is a more detailed schematic block diagram of the finger biometric sensor and related circuitry of FIG. 5.

One possible implementation of a sense circuit 23' includes a zener diode 35' coupled in parallel with the electrically conductive layers 16', 17' to operate a shunt regulator with outputs that may be coupled to a level sensitive wake-up input or analog measurement input, for example, as shown in FIG. 6. This implementation may be particularly advantageous for power control applications.

The sense circuit 23' may also generate a pressure output signal related to an amount of pressure applied by the user's finger 21'. The amount of applied pressure can advantageously be used to enhance a user interface or enhance menu navigation, for example. For example, the pressure information may be advantageously used as a second measurement dimension to assist both fingerprint verification and cursor or control navigation. In a cursor or control navigation mode, a measured increase in pressure, as indicated by an increase in the voltage of the signal, could be interpreted as a command from the user to accelerate the directed cursor movement. Alternatively, a relaxation of pressure, as indicated by a reduction in voltage of the signal, can be interpreted as a command to slow down the cursor movement. It should be understood that other conventions for navigation or control may be used based upon the pressure applied by the user's finger 21'.

When used in analog finger pressure measurements, the piezoelectric transducer layer 14' may be coupled to an analog input port, or the signal may be conditioned using adjustable attenuators, or adjustable gain amplifiers. Where readout of the finger pressure is desired, a charge amplifier, or an electrical integrating circuit, including appropriate reset circuitry, may be used to convert the charge displacement generated by the piezoelectric transducer layer 14' into a voltage proportional to the actual pressure. This circuitry may be included on the finger biometric sensor 10' or a boot device external to the finger biometric sensor. Other arrangements may be implemented, as will be appreciated by those skilled in the art.

Figure 7:
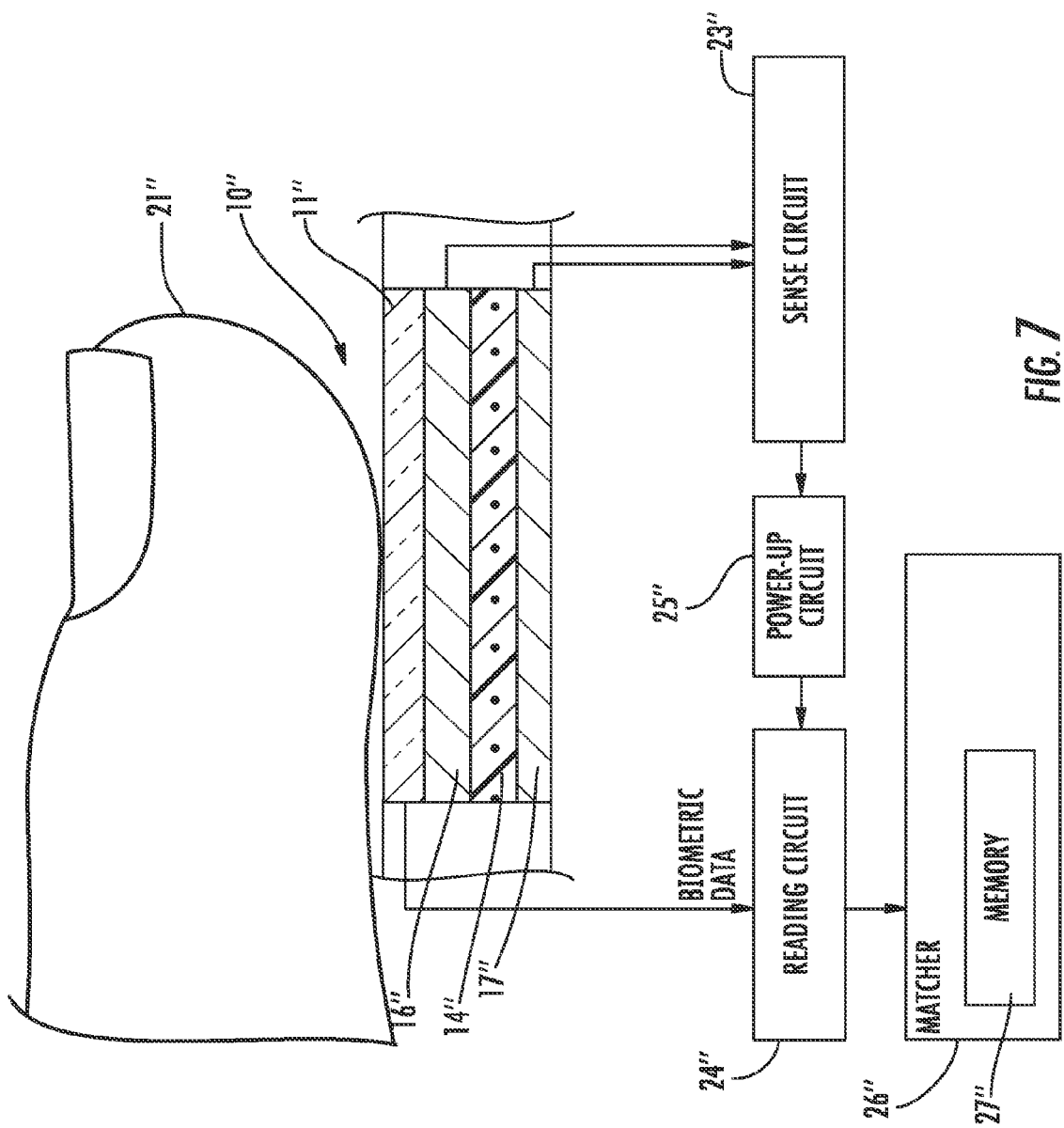
FIG. 7 is a schematic block diagram of yet another embodiment of a finger biometric sensor and related circuitry in accordance with the present invention.

Referring now to FIG. 7, in addition to the sense circuit 23" as described above, in other embodiments, the finger biometric sensor 10" also illustratively includes a reading circuit 24" coupled to the finger biometric sensing layer 11" for reading signals therefrom. A power up circuit 25" selectively powers up the reading circuit 24" based upon the sense circuit 23".

More particularly, the sense circuit 23" senses the signal or the presence of the force on the piezoelectric transducer layer 14" via the intervening electrically conductive layer 16" and cooperates with the power up circuit 25" to selectively power up the reading circuit 24" based upon the signal or force.

The reading circuit 24" reads signals from the finger biometric layer 11". The signals may be fingerprint image signals, or signals representing other finger biometrics. Advantageously, by selectively powering up the reading circuit 24" based upon the charge displacement or pressure signal from an applied force, the finger biometric sensor 10" provides a zero power consumption finger detection capability while in a standby mode, or finger-waiting mode. Thus, overall system power consumption is reduced and battery life in the portable device is increased.

The finger biometric sensor 10" also illustratively includes a matcher 26" coupled to the finger biometric sensing layer 11" for determining a match based upon the at least one biometric characteristic of the user's finger 21". The matcher 26" may include or cooperate with a memory 27" to store biometric characteristics. Each circuit described above may be used alone or in combination with the other circuits described herein or other circuitry that may be included in the finger biometric sensor 10" or part of a host device, or be included in both the finger biometric sensor or the host device, for example.

Moreover, the power up circuit 25" can also be used to wake up the finger biometric sensor 10" when a finger 21" is first applied by connecting the pressure signal to an interrupt line or other wake-up pin in the system. The interrupt line or other wake-up pin may be, for example, on or off the finger biometric sensor 10". In other words, the wake-up pin may be part of a host processor in a host device.

Figure 8:
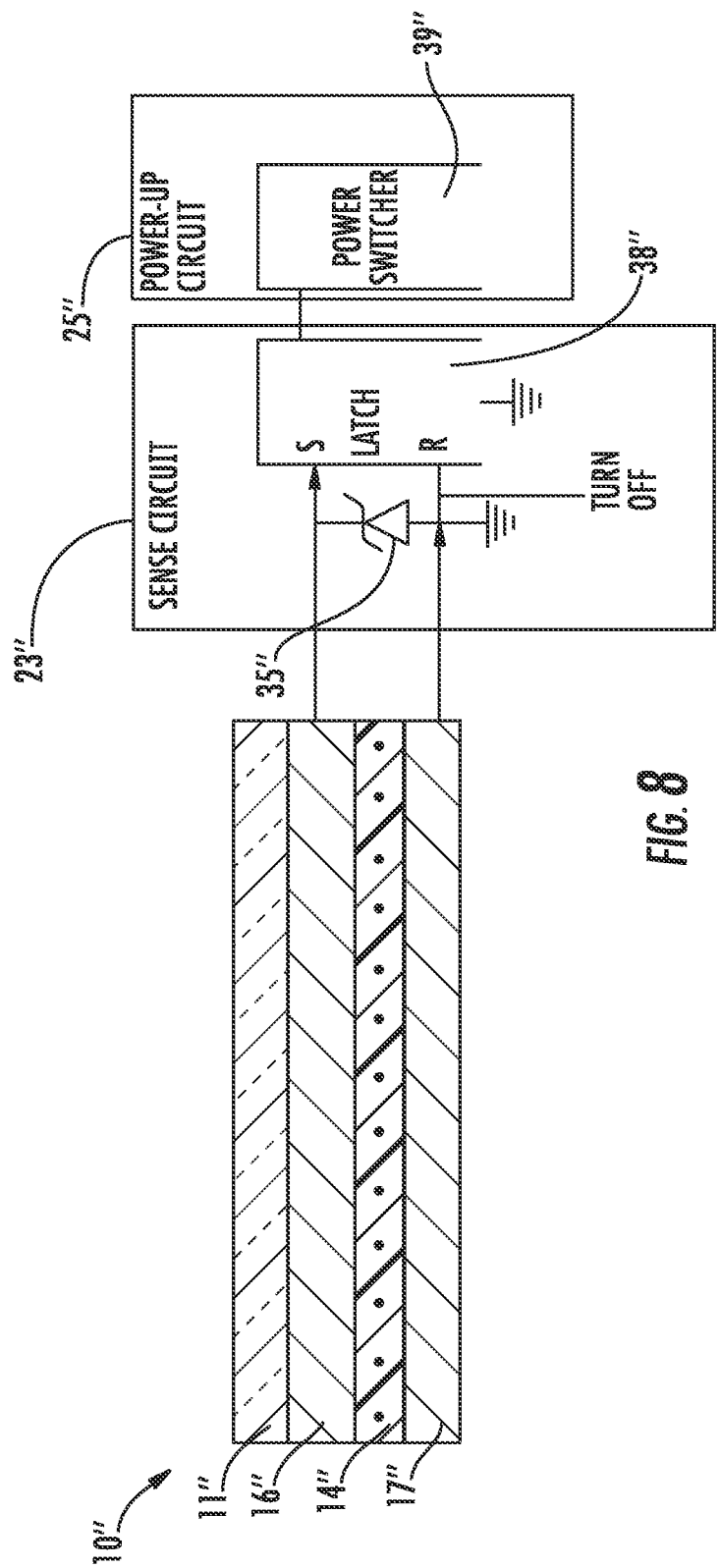
FIG. 8 is a more detailed schematic block diagram of the finger biometric sensor and related circuitry of FIG. 7.

Referring now additionally to FIG. 8, a possible implementation of the sense circuit 23" and the power up circuit 25" includes a zener diode 35" that is coupled in parallel with the electrically conductive layers 16", 17" to operate as a shunt regulator with out puts that may be coupled to an asynchronous latch 38". The asynchronous latch 38" is illustrated as an SR type, but other types may be used. The outputs of the asynchronous latch 38" may feed the power up circuit 25", which illustratively includes a power switching device 39". The power switching device 39" and the asynchronous latch 38" may be part of the finger biometric sensor 10" or part of a host processor or host integrated circuit, or part of both, for example. Using the voltage limiting components advantageously reduces the amount of quiescent power consumption, as will be appreciated by those skilled in the art. Other components and configurations, such as a Schmidt trigger or a voltage reduction network, may be used.

Figure 9:
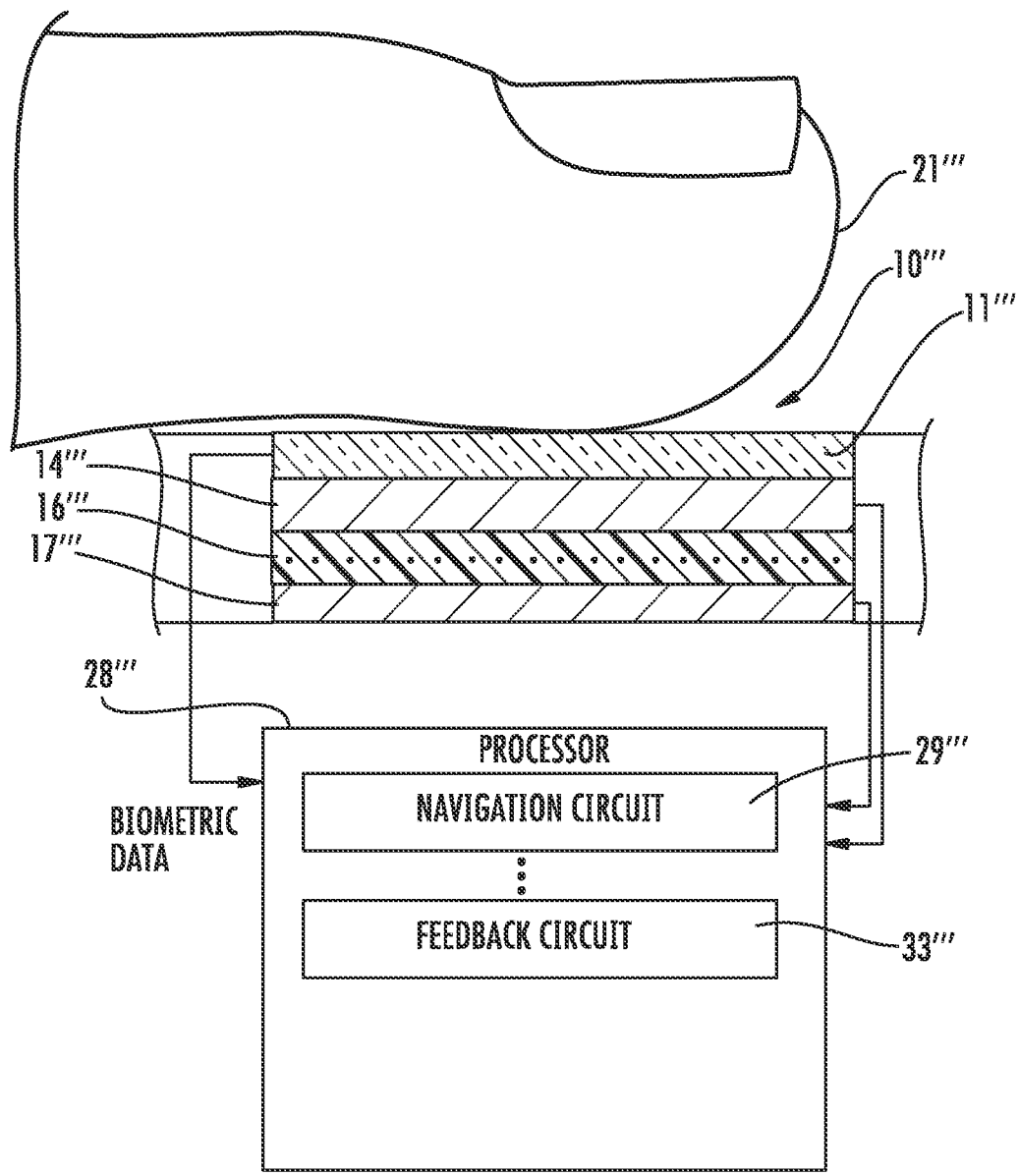
FIG. 9 is a schematic block diagram of another embodiment of the finger biometric sensor and related circuitry in accordance with the present invention.

Referring now additionally to FIG. 9, a processor 28''', which includes a navigation module or circuit 29''' and a feedback module or circuit 33''', is illustratively included in the finger biometric sensor 10''' and may be coupled to the electrically conductive layers 16''', 17'''. While the processor 28''' is illustratively included in the finger biometric sensor 10''', it may be external to the finger biometric sensor, for example, on a host device, or may be included on both the finger biometric sensor or host device. Still further, while the processor 28''' illustratively includes both the navigation circuit 29''', to perform the navigation functions as discussed above, and the feedback circuit 33''', to provide user feedback as discussed above, either circuit may be used independently of the other. Moreover, other modules or circuits may be included in the processor 28''' to perform other functions or cooperate with other circuits to perform those functions.

Figure 10:
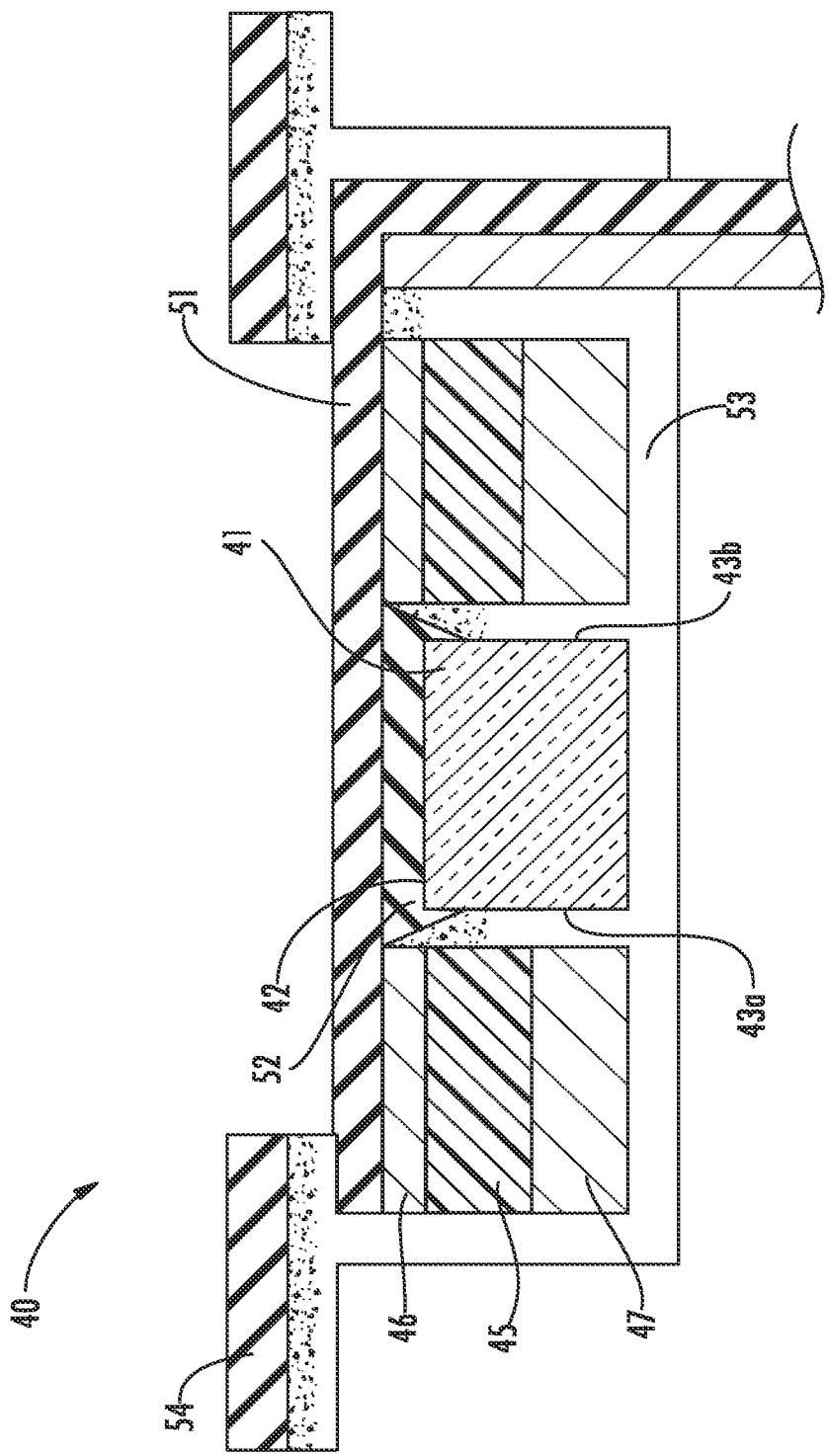
FIG. 10 is a schematic cross-sectional view of another embodiment of the finger biometric sensor.

In an alternate embodiment, as illustrated in FIG. 10, a finger biometric sensor 40 includes a finger biometric sensing layer 41 having an upper major surface 42 and sidewall surfaces 43a-43b adjacent thereto. The biometric sensing layer 41 is for generating signals related to at least one biometric characteristic of the user's finger when positioned adjacent the upper major surface. A piezoelectric transducer layer 45 is adjacent the sidewall surfaces 43a-43b of the finger biometric sensing layer 41. The piezoelectric transducer layer 45 is similar in material and form to the piezoelectric transducer layer 14 described above.

Ring-shaped, upper and lower, electrically conductive layers 46, 47 are coupled to the piezoelectric transducer layer 45 to define transducer electrodes. More particularly the upper conductive layer 46 may also serve as a finger drive electrode and is coupled between the finger sensing layer 41 and the piezoelectric transducer layer 45. The upper conductive layer 46 advantageously has a shared function as both a drive electrode for the finger sensing layer 41 and one of the transducer electrodes for the piezoelectric transducer layer 45. A shared function electrode advantageously reduces the number of electrodes, and thus may reduce the overall package size of the finger biometric sensor 40. However, in some embodiments, the electrode(s) may not be shared, and additional electrode(s) may be included.

A second transducer electrode provided by the lower conductive layer 47 may be considered as the piezoelectric voltage electrode and is illustratively coupled to the bottom of the piezoelectric transducer layer 45. As will be appreciated by those skilled in the art, a piezoelectric voltage is generated between the conductive layers 46, 47 when a force is imparted by a user's finger to the piezoelectric transducer layer 45 via the intervening electrically conductive layer 46. In other embodiments there may be no intervening layer or more than one intervening layer.

The finger biometric sensing layer 41 is advantageously packaged as an integrated circuit, for example. Other packaging arrangements will be appreciated by those skilled in the art. Additionally, a flexible mounting substrate 51 overlays the piezoelectric transducer layer 45 and the finger biometric sensing layer 41, and is a Kapton® material, available from E. I. du Pont de Nemours and Company. Other substrate materials may be used. An underfill 52 provides separation between the flexible mounting substrate 51 and the finger biometric sensing layer 41. Additionally the piezoelectric transducer layer 45 and the finger biometric sensing layer 41 are joined by an adhesive 53. The adhesive 53 may also be used to join other components and layers, as will be appreciated by those skilled in the art. An optional sealing ring 54 is provided overlapping a portion of the flexible mounting substrate 51.

Similar to the finger biometric sensor 10 embodiments described above in FIGS. 1-3, the finger biometric sensor 40 may be included in a cellular telephone 50, or other portable electronics device, and also may include a drive circuit 22. The drive circuit 22 is coupled to the transducer electrodes, or more particularly, to the upper conductive layer 46 and the lower conductive layer 47 to drive the piezoelectric transducer layer 45 to impart a force to the user's finger. Additionally, the finger biometric sensor 40 may include a sense circuit 23 coupled to the upper conductive layer 46 and the lower conductive layer 47 to sense from the piezoelectric transducer layer 45 a force imparted by the user's finger.

Still further, the finger biometric sensor 40 may include a reading circuit 24 coupled to the finger biometric sensing layer 41 for reading signals therefrom. A power up circuit 25 may also be included for selectively powering up the reading circuit based upon the sense circuit 23. The sense circuit 23 may generate a pressure output signal related to the amount of pressure applied by the user's finger. The finger biometric sensor 40 may include a matcher 26 coupled to the finger biometric sensing layer 41 for determining a match based upon the at least one biometric characteristic of the user's finger, as is similar in structure and implementation to the matcher 26 described above. These circuits 22, 23, 24, 25, 26 as they are coupled to the finger biometric sensor 40, are similar in structure and function to the circuits described above for the finger biometric sensor embodiments illustrated in FIGS. 1-8.

Similarly, a processor 28, which includes a navigation circuit 29 and a feedback circuit 33, is included in the finger biometric sensor 40 and may be coupled to the upper conductive layer 46 and the lower conductive layer 47. While the processor 28 may be included in the finger biometric sensor 40, it may be external to the finger biometric sensor, for example, a host processor. Still further, while the processor 28 illustratively includes both the navigation circuit 29 and the feedback circuit 33, either circuit may be used independently of the other.

Figure 11:
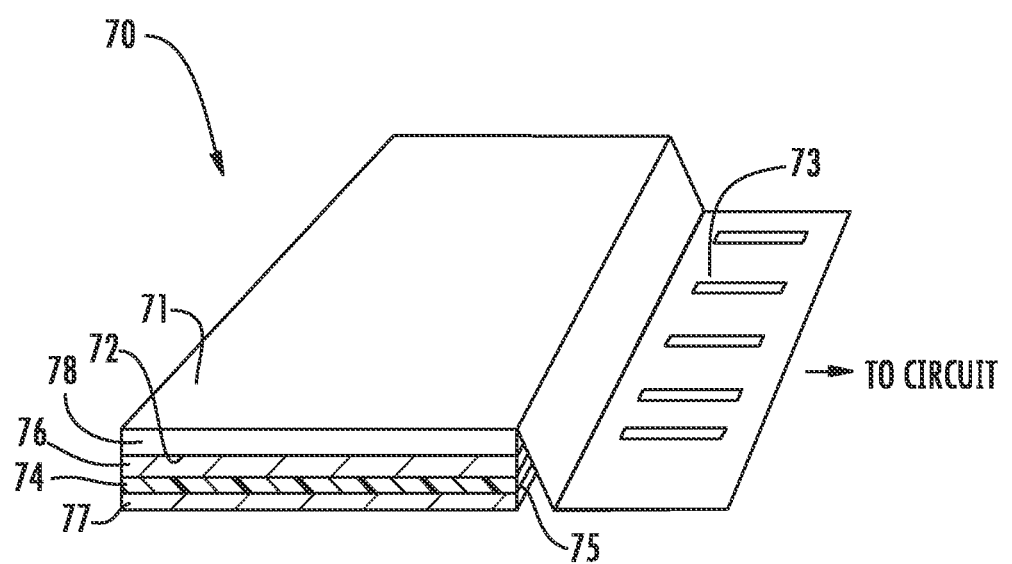
FIG. 11 is a perspective view of another embodiment of the finger biometric sensor.

Referring now to FIG. 11, the finger biometric sensor 70 illustratively includes a flex tape or a tab interconnect 73 cooperating with the biometric sensing layer 72. The biometric sensing layer 72 includes a sensing surface 71 and a sensor back cover 78 enclosing the biometric sensing layer. The upper conductive layer 76 is illustratively coupled to the bottom of the sensor back cover 78 of the biometric sensing layer 72. The piezoelectric transducer layer 74 is illustratively coupled to the upper conductive layer 76. The lower conductive layer 77 is coupled to the bottom of the piezoelectric transducer layer 74. The flex tape, or tab interconnect 73, advantageously attaches to a circuit (not shown) so that the sensing surface 71 is exposed through an opening in a host device housing for surface access by the user's finger, for example.

Returning again to FIGS. 1-3, another aspect is directed to a method of making a finger sensor 10. The method includes providing a finger biometric sensing layer 11 having opposing first and second major surfaces 12, 13. The finger biometric sensing layer 11 is for generating signals related to at least one biometric characteristic of the user's finger 21 when positioned adjacent the first major surface 12. The method further includes coupling a piezoelectric transducer layer 14 to the second major surface 13 of the finger biometric sensing layer 11. The method further includes coupling two electrically conductive layers, the upper conductive layer 16, and the lower conductive layer 17, to the piezoelectric transducer layer 14 to define transducer electrodes.

Returning again to FIG. 10, another aspect is directed to another method of making the finger sensor 40. The method includes providing a finger biometric sensing layer 41 having an upper major surface 42 and sidewall surfaces 43a-43b adjacent thereto. The finger biometric sensing layer 41 is for generating signals related to the user's finger when positioned adjacent the upper major surface 42. The method further includes coupling a piezoelectric transducer layer 45 to the sidewall surfaces 43a-43b of the finger biometric finger sensing layer 41. The method further includes coupling electrically conductive layers, or more particularly, the upper conductive layer 46 and the lower conductive layer 47, to the piezoelectric transducer layer 45 to define transducer electrodes.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor comprising:
   a finger biometric sensing layer capable of generating signals related to at least one finger biometric characteristic;
   a piezoelectric transducer layer laterally adjacent said finger biometric sensing layer; and
   a plurality of electrically conductive layers coupled to said piezoelectric transducer layer to define transducer electrodes, at least one of said electrically conductive layers comprising a drive electrode capable of cooperating with said finger biometric sensing layer and coupling a radio frequency (RF) signal with a finger.

2. The finger biometric sensor according to claim 1 further comprising a drive circuit coupled to said transducer electrodes and capable of driving said piezoelectric transducer layer to impart a force to the finger.

3. The finger biometric sensor according to claim 1 further comprising a sense circuit coupled to said transducer electrodes and capable of sensing from said piezoelectric transducer layer a force imparted by the finger.

4. The finger biometric sensor according to claim 3 further comprising:
   a reading circuit coupled to said finger biometric sensing layer and capable of reading signals therefrom; and
   a power up circuit capable of selectively powering up said reading circuit based upon said sense circuit.

5. The finger biometric sensor according to claim 3 wherein said sense circuit is capable of generating a pressure output signal related to pressure applied by the finger.

6. The finger biometric sensor according to claim 1 further comprising a matcher coupled to said finger biometric sensing layer and capable of determining a match based upon the at least one finger biometric characteristic.

7. The finger biometric sensor according to claim 1 further comprising a navigation circuit coupled to said transducer electrodes and capable of performing at least one navigation function.

8. The finger biometric sensor according to claim 1 further comprising a feedback circuit coupled to said transducer electrodes and capable of performing at least one feedback function.

9. The finger biometric sensor according to claim 1 wherein said finger biometric sensing layer comprises an integrated circuit finger biometric sensing layer.

10. The finger biometric sensor according to claim 1 wherein the at least one finger biometric characteristic comprises a fingerprint pattern.

11. A method for making a finger biometric sensor comprising:
   forming a finger biometric sensing layer capable of generating signals related to at least one finger biometric characteristic;
   forming a piezoelectric transducer layer laterally adjacent the finger biometric sensing layer; and
   forming a plurality of electrically conductive layers coupled to the piezoelectric transducer layer to define transducer electrodes, at least one of the electrically conductive layers comprising a drive electrode capable of cooperating with the finger biometric sensing layer and coupling a radio frequency (RF) signal with a finger.

12. The method according to claim 11 further comprising forming a drive circuit coupled to the transducer electrodes and capable of driving the piezoelectric transducer layer to impart a force to the finger.

13. The method according to claim 11 further comprising forming a sense circuit coupled to the transducer electrodes and capable of sensing from the piezoelectric transducer layer a force imparted by the finger.

14. The method according to claim 11 wherein forming the finger biometric sensing layer comprises forming the finger biometric sensing layer as part of an integrated circuit.

15. The method according to claim 11 wherein the at least one finger biometric characteristic comprises a fingerprint pattern.

16. A finger biometric sensor comprising:
a finger biometric sensing layer capable of generating signals related to at least one finger biometric characteristic and comprising a plurality of electric field sensing pixels;
a piezoelectric transducer layer laterally adjacent said finger biometric sensing layer; and
a plurality of electrically conductive layers coupled to said piezoelectric transducer layer to define transducer electrodes.

17. The finger biometric sensor according to claim 16 wherein at least one of said plurality of electrically conductive layers is capable of cooperating with said finger biometric sensing layer.

18. The finger biometric sensor according to claim 16 further comprising a drive circuit coupled to said transducer electrodes and capable of driving said piezoelectric transducer layer to impart a force to the finger.

19. The finger biometric sensor according to claim 16 further comprising a sense circuit coupled to said transducer electrodes and capable of sensing from said piezoelectric transducer layer a force imparted by the finger.

20. The finger biometric sensor according to claim 16 further comprising a matcher coupled to said finger biometric sensing layer and capable of determining a match based upon the at least one finger biometric characteristic.

21. The finger biometric sensor according to claim 16 wherein said finger biometric sensing layer comprises an integrated circuit finger biometric sensing layer.

22. The finger biometric sensor according to claim 16 wherein the at least one finger biometric characteristic comprises a fingerprint pattern.

23. A method for making a finger biometric sensor comprising:
forming a finger biometric sensing layer capable of generating signals related to at least one finger biometric characteristic and comprising a plurality of electric field sensing pixels;
forming a piezoelectric transducer layer laterally adjacent the finger biometric sensing layer; and
forming a plurality of electrically conductive layers coupled to the piezoelectric transducer layer to define transducer electrodes.

24. The method according to claim 23 wherein forming the plurality of electrically conductive layers comprises forming at least one of said electrically conductive layers to be capable of cooperating with said finger biometric sensing layer.

25. The method according to claim 23 further comprising forming a drive circuit coupled to the transducer electrodes and capable of driving the piezoelectric transducer layer to impart a force to the finger.

26. The method according to claim 23 further comprising forming a sense circuit coupled to the transducer electrodes and capable of sensing from the piezoelectric transducer layer a force imparted by the finger.

27. The method according to claim 23 wherein forming the finger biometric sensing layer comprises forming the finger biometric sensing layer as part of an integrated circuit.

28. The method according to claim 23 wherein the at least one finger biometric characteristic comprises a fingerprint pattern.

\* \* \* \* \*